United States Patent [19] [11] 4,023,146

Carroll [45] May 10, 1977

[54] METHOD FOR COMPUTING AND EVALUATING EMERGENCY PRIORITY AND EVACUATION ROUTES FOR HIGH RISE BUILDINGS, MINES AND THE LIKE

[76] Inventor: Wayne E. Carroll, 206 Fairway, Longwood, Fla. 32750

[22] Filed: Feb. 3, 1976

[21] Appl. No.: 654,739

[52] U.S. Cl. .............................. 340/172.5; 340/414

[51] Int. Cl.² ...................... G06F 3/00; G08B 19/00

[58] Field of Search ............... 340/172.5, 412, 413, 340/414, 415

[56] References Cited

UNITED STATES PATENTS

| | | | |
|---|---|---|---|
| 3,708,785 | 1/1973 | Rawson et al. | 340/172.5 |
| 3,744,028 | 7/1973 | Kirk | 340/172.5 |
| 3,806,921 | 4/1974 | Pappas | 340/412 |

*Primary Examiner*—Raulfe B. Zache
*Attorney, Agent, or Firm*—Duckworth, Hobby, Orman, Allen & Pettis

[57] ABSTRACT

An evacuation priority system for use in installations having a plurality of separate areas therein includes a plurality of detecting means, such as fire or smoke detectors, each for detecting an appropriate alarm condition in the respective area. Inputs from each area responsive to the alarm condition are received by a central processing unit (CPU), and a priority is computed between the inputs on a predetermined basis dependent upon the relative emergency between the alarm conditions detected. An evacuation route is then selectively fed into an indicating means within each area, on a priority basis or simultaneously, to identify appropriate evacuation routes from each area. Information received by the CPU is forwarded to the appropriate emergency agency, for determining the appropriate equipment and manpower to be used. In addition, information received and processed by the CPU is stored to document the emergency to help reconstruct and avoid similar occurrences.

5 Claims, 1 Drawing Figure

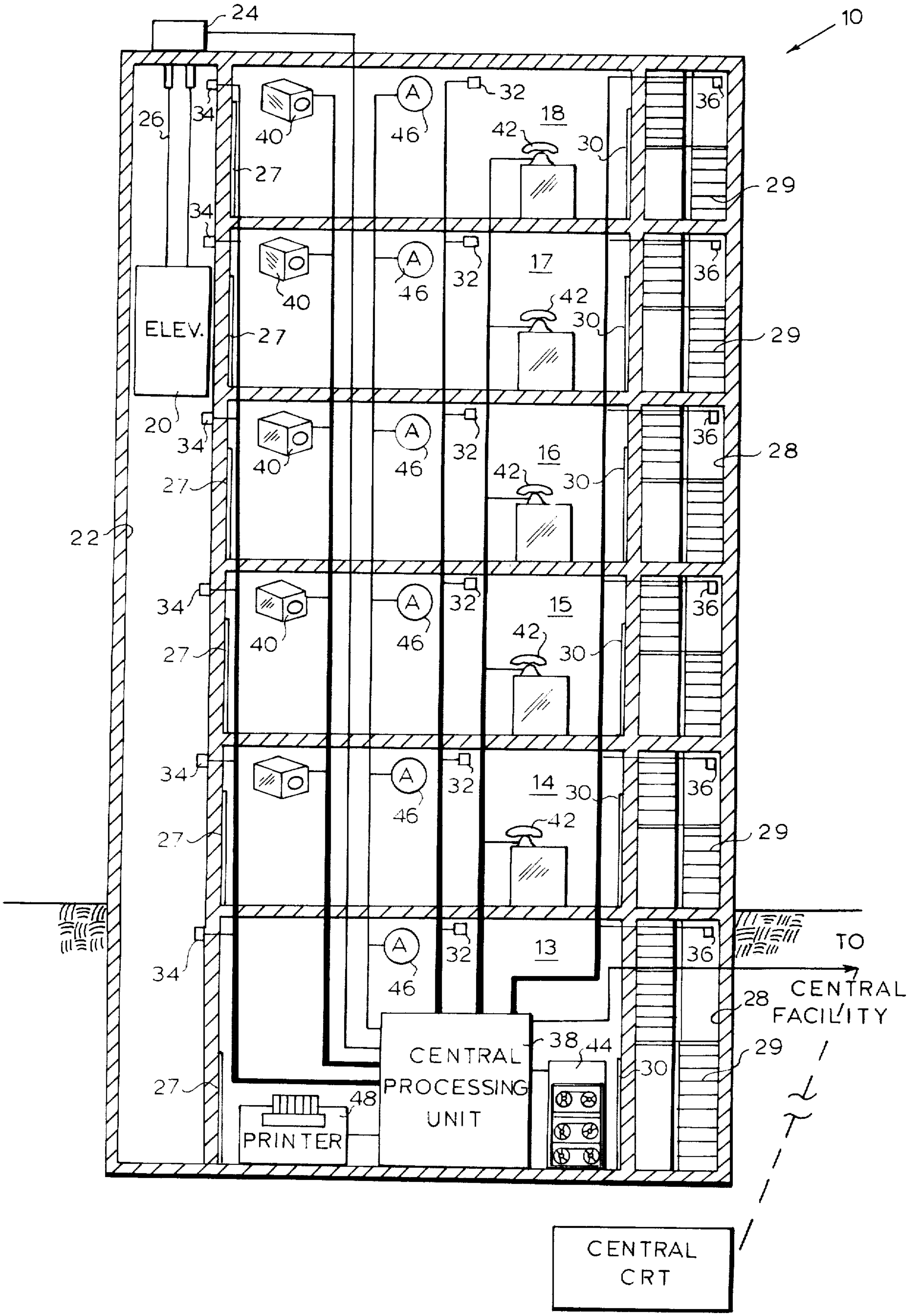
10
24
26
34
27
40
46
32
18
42
30
36
29
ELEV.
20
17
16
28
22
15
14
13
CENTRAL PROCESSING UNIT
38
44
48
PRINTER
TO CENTRAL FACILITY
CENTRAL CRT

METHOD FOR COMPUTING AND EVALUATING EMERGENCY PRIORITY AND EVACUATION ROUTES FOR HIGH RISE BUILDINGS, MINES AND THE LIKE

BACKGROUND OF THE INVENTION

1. Field of the Invention

The present invention relates to alarm systems and methods, and in particular relates to such systems and methods which are desinged to provide a response back into the area wherein the alarm condition exists, either sequentially on a priority basis or simultaneously, and to further provide persons within that area with an indication of an appropriate evacuation route; and to thereafter provide and notify a central facility as to an appropriate response to the emergency condition.

2. Description of the Prior Art

Various systems have been devised in the past for providing an indication of an alarm condition, e.g. fire or smoke, in remote areas within the same building or complex. Generally, the purpose of these prior art systems is to advise a central facility that an alarm condition exists, in order that approriate steps can be taken. See, for example, U.S. Pat. No. 3,823,391 to Worsley et al, which discloses a system for monitoring remotely related buildings. Other such arrangements are disclosed in one or more of the following U.S. Pat. Nos. 3,623,087 to Gallichotte; 3,305,850 to Suozzo et al; 3,312,965 to Ward; 3,707,708 to Dan; 2,942,245 to Wooten.

In U.S, Pat. No. 3,854,127, Damon discloses an arrangement for providing an automatic ring back to the sensed location after the sensed condition is received at a central facitlity. In. U.S. Pat. No. 3,801,971, Stendig et al disclose an arrangement for utilizing a telephone circuit to respond to an alarm condition in a particular area, in order to send an appropriate alarm signal to a remote facility.

In U.S. Pat. No. 3,582,949, to Forst, there is disclosed an audio visual enunciator with priority ranking for each condition. As disclosed, a logic circuit assigns a priority ranking to a plurality of sequentially or simultaneously occurring inputs, and provides a response dictated by the highest priority condition.

While the alarm systems described above provide an indication to persons located in a remote area, such prior art systems have generally not been concerned with providing feedback to persons located within the alarm area on a priority basis, or with providing an indication as to the best evacuation route from the area in which the emergency condition exists.

SUMMARY OF THE INVENTION

The present invention contemplates a system and method for providing an evacuation priority, and which is to be used in installations such as buildings, mines, ships and the like of the type having a plurality of separate areas therein. The priority system, and the method used therewith, comprises a plurality of detection means, such as smoke and fire detectors, for detecting an alarm condition in each of the areas. Means are provided for receiving an input from all of the detection means and computing a priority between the inputs on a predetermined basis dependent upon the relative emergency, i.e. priority, between said alarm conditions. Indicating means, such as visual or audio input devices, are provided for receiving an output from the computing means representative of the emergency priority and providing an indication to persons in the area of highest priority, in order to identify the alarm condition.

In a preferred embodiment, the computing means and the indicating means located within the various areas of the installation are capable of providing an indication of the best evacuation route for persons located in the area of highest priority, as well as other areas of lower emergency priority; and to also provide a central facility with an indication of the alarm condition.

THE DRAWING

The single FIGURE of the drawing is a cross-sectional view, partially in schematic circuit form, of a building employing the system of the present invention.

DETAILED DESCRIPTION

An embodiment of the present invention is shown in the drawing and described with reference thereto. While a multi-story building, such as a conventional office building is shown, it will be understood that the present invention has application in single storied buildings, as well as in mines, ships and in other installations having a plurality of separate areas within.

The building, referred to generally as 10, may have a basement floor 13 and five above-ground floors 14, 15, 16, 17 and 18. The basement and these five floors are hereinafter referred to collectively as the "areas 13-18", or individually by an appropriate reference numeral. By way of example, the building may include an elevator 20 disposed in an elevator shaft 22 and controlled by a unit 24, which is generally positioned near the top of the building, and which includes control cables 26 between the unit 24 and the elevator 20. The building is provided with an elevator door 27 in each of the areas 13-18.

In this example, the building 10 is also provided with a stairwell 28 having stairs 29 between each of the areas 13-18, with a stairwell door 30 at each area.

In accorance with the present inventon, the building 10 is provided with a system for evaluating aand computing priorites as to emergencies in each area level, and providing an indication to persons within each area as to the relative emergency condition. This priority system includes area detectors 32, each of which is disposed in a corresponding one of the areas 13-18. These detectos may constitute either smoke or fire detectos, or a combination of both. Alternatively, other types of detectors may be employed dependent upon the particular application employed, it being understood that the purpose is to provide some indication of an undesirable condition, although in some cases a desirable condition may be that which is to be sensed.

Additionally, a plurality of elevator shaft detectors 34 are spaced along the elevator shaft 22 in order to detect undesirable conditions within the elevator shaft. Similarly, stairwell detectors 36 are spaced through the stairwell 28, preferably at least one at each level corresponding to each of the areas 13-18.

In accordance with the present invention, a central processing unit 38, shown in this example as disposed within the basement area 13, is provided. The function of this central processing unit 38 will be described in detail below with respect to the operation of the system shown in the drawing. All of the area detectors 32 are coupled by a respective input line to the central processing unit 38. Likewise, the elevator and stairwell detectos 34, 36 are coupled by input lines to the central processing unit 38. Alternatively, each detector 32, 34 and 36 may be provided with coding means, such as standard multiplexing circuits, to indicate the respective area 13-18 in which the detectors 32, 34 or 36 is located, and all of the detectors placed on a common input line to the central processing unit 38. Techniques for bussing detector inputs to a central location are described in the aforementioned prior art patents, such as the patents to Worsley et al., Ward and Gallichote et al., and will therefore not be elaborated on here.

The system of the present invention also includes visual and/or audio indicating means coupled with the central processing unit 38 for advising persons within each of the areas 13-18 of an emergency condition. While various types of audio and visual indicator means are available, in the example shown in the drawing such means include a cathode ray tube 40 which is preferably disposed adjacent the elevator door 27 in each of the areas 13-18. The indicating means may also include telephones 42 each of which are coupled to the central processing unit 38. Additionally, a bank of tape recorders 44 are coupled to the central processing unit 38 and are controlled thereby for playing pre-recorded messages into the telephone instruments 42 as is further described below. The indicating means may also include alarm signal, such as flashing lights or bells, generally shown at 46 in each respective area 13-18. The priority system of the present invention may be also provided with a printer 48 used in conjunction with the central processing unit 38 for providing a hard copy of the various priority selections and messages generated by the central processing unit 38, as is further described below.

Operation of the priority system used in conjunction with the building 10 will now be described. The central processing unit 38 may be a mini-computer of conventional design having programming associated therewith for processing inputs from the detectors 32, 34 and 36 and providing corresponding inputs to the appropriate indicating devices 40, 42, 46 and 48 responsive to the appropriate emergency priority between the areas 13-18. That is, the programming associated with the central processing unit 38 selects the area 13-18 of highest emergency priority, which is, in this example, the area in which a detector 32, 34 or 36 provides a first indication of an emergency condition. Other examples of such priority selection techniques are disclosed in the aforementioned patent to Forst. Additionally, programming techniques for providing feedback on a real time basis responsive to predetermined inputs are disclosed in U.S. Pat. No. 3,767,901 to Black et al., are well known in the computer programming art, and the details of such programming will not be elaborated on here. The purpose of this priority selection system is to provide an initial indication to persons in one of the areas 13-18 which has the area of highest priority without unnecessarily alarming persons in other of the areas, in order that an orderly evacuation may be made, following such priority basis.

Further, the priority system of the present invention is employed to provide an indication of an emergency evacuation route to persons within each area 13-18. This is done in conjunction with te central processing unit 38 and one or more of the indicating devices 40, 42 and 46. In one embodiment, the tape recorders 44 include selected pre-recorded messsages thereon for playback through the telephone instruments 42. For example, if a fire condition is detected throughout area 16, including the stairwell 28 and the elevator shaft 22 adjacent thereto, then the central processing unit 38 selects a pre-recorded message 42 such as : "THIS IS AN EMERGENCY: PROCEED UP STAIRWELL TO ROOF" to be played through the telephone units 42 in areas 17 and 18 above area 16, and a corresponding instruction for persons in areas 13, 14 and 15 to proceed to the ground level through the stairwell 28.

In another example, if a fire condition is detected in the stairwell 28 adjacent the area 16, but not in the elevator shaft 22, then an appropriate pre-recorded message from the recorders 44 through the telephone instruments 42 to persons in the areas 16, 17 and 18 would be to proceed to the corresponding elevator door 27 for evacuation through the elevator 22. Priority operation of the elevator 20 is controlled by the central processing unit 38 through the elevator control unit 24. It will be understood that similar messages may be distributed by use of the cathode ray tube 40 which preferably are located adjacent each elevator door 27 in the corresponding areas 13-18.

Noting the output of the CPU 38 marked "to central facility", this output is forwarded to a fire station or the like wherein the central facility is automatically advised of the location, and status, of the fire. This information can be used at the fire station to allocate resources; that is, for the proper selection of fire equipment and manpower.

The priority system of the present invention provides a means for selecting priorities as between different areas in a multi-area building, mine, ship or the like in order to enable the orderly evacuation of that installation. Further, this priority system allows preselected evacuation routes to be communicated to persons within particular areas, in order that evacuation through endangered areas is avoided.

In addition to the information which is sent to the areas 13-18, the system 10 of the present invention may be utilized to send a profile of the emergency condition to the central facility, as outlined above. This information may be sent, for example, to a cathode ray tube terminal (denoted as the "central CRT" in the drawing) to advise the central facility, such as a fire station, of the status of the alarm condition. In this manner, an effective utilization of manpower can be made. For example, if the fire is limited to the ground floor area 14, then it would be unnecessary for the fire department to immediately bring ladder vehicles to the scene of the fire. Alternatively, if the fire was in the uppermost floor 18, then ladder vehicles or helicopters would be needed immediately.

I claim:

1. The method for determining evacuation priority and providing an indication thereof for use in installations such as buildings, mines, ships and the like of the type having a plurality of separate areas within, said method comprising the steps of:

detecting an alarm condition in one of said areas and providing an input responsive thereto;

receiving said inputs from all of said areas and computing a priority between said inputs on a predetermined basis dependent upon the relative emergency between said alarm conditions; and providing an indication representative of said emergency priority to that one of said areas representing the highest emergency priority.

2. The method for determining evacuation priority as recited in claim 1 further comprising the step of forwarding an output indicative of the results of said computing step to a central facility.

3. The method for determining evacuation priority as recited in claim 1 further comprising the steps of:

computing an evacuation route for said area of highest emergency priority; and communicating said evacuation route to persons within said area of highest emergency priority.

4. The method for determining evacuation priority as recited in claim 3 further comprising the step of communicating said evacuation route to others of said area.

5. The method for determining evacuation priority as recited in claim 1 wherein said installation includes means for transporting persons between said areas, said method further comprising the steps of:

controlling and directing said transporting means to different ones of said areas responsive to an input thereto; and providing an input to said transporting means conincident with said indication of emergency priority to direct said transporting means to said area of highest emergency priority.

* * * * *